(12) United States Patent
Burt et al.

(10) Patent No.: US 8,830,360 B1
(45) Date of Patent: Sep. 9, 2014

(54) METHOD AND APPARATUS FOR OPTIMIZING IMAGE QUALITY BASED ON SCENE CONTENT

(75) Inventors: Peter Jeffrey Burt, Princeton, NJ (US); Sek Meng Chai, Princeton, NJ (US); David Chao Zhang, Belle Mead, NJ (US); Michael Raymond Piacentino, Robbinsville, NJ (US); Gooitzen Siemen van der Wal, Hopewell, NJ (US); Peter Alan Levine, West Windsor, NJ (US); Thomas Lee Vogelsong, Lawrenceville, NJ (US); John Robertson Tower, Yardley, PA (US)

(73) Assignee: SRI International, Menlo Park, CA (US)

( * ) Notice: Subject to any disclaimer, the term of this patent is extended or adjusted under 35 U.S.C. 154(b) by 2 days.

(21) Appl. No.: 13/218,152

(22) Filed: Aug. 25, 2011

Related U.S. Application Data

(60) Provisional application No. 61/376,754, filed on Aug. 25, 2010.

(51) Int. Cl.
*H04N 5/217* (2011.01)
*H04N 5/21* (2006.01)
*H04N 9/78* (2006.01)
*G06K 9/48* (2006.01)

(52) U.S. Cl.
USPC ............ 348/241; 348/655; 348/625; 382/199

(58) Field of Classification Search
USPC ........................................................ 348/241
See application file for complete search history.

(56) References Cited

U.S. PATENT DOCUMENTS

| 5,140,416 | A | 8/1992 | Tinkler |
| 5,359,674 | A | 10/1994 | van der Wal |
| 5,488,674 | A | 1/1996 | Burt et al. |
| 5,963,657 | A | 10/1999 | Bowker et al. |
| 7,015,960 | B2 | 3/2006 | Tay |
| 2009/0309998 | A1* | 12/2009 | Grosvenor et al. ........... 348/241 |
| 2010/0149420 | A1* | 6/2010 | Zhang et al. ................. 348/655 |
| 2011/0074966 | A1* | 3/2011 | Cerosaletti et al. ........ 348/222.1 |
| 2011/0187934 | A1* | 8/2011 | Pan et al. ...................... 348/625 |
| 2011/0205395 | A1* | 8/2011 | Levy ........................... 348/229.1 |
| 2011/0221936 | A1* | 9/2011 | Steinberg et al. ............. 348/241 |
| 2012/0050074 | A1* | 3/2012 | Bechtel et al. ................ 340/988 |
| 2013/0124471 | A1* | 5/2013 | Chen et al. .................... 707/624 |

OTHER PUBLICATIONS

"On-Chip Spatial Image Processing with CMOS Active Pixel Sensors", Canaan Sungkuk Hong, A thesis presented to the University of Waterloo in fulfillment of the thesis requirement for the degree of Doctor of Philosophy in Electrical and Computer Engineering, Waterloo, Ontario, Canada, 2001, 238 pages.

(Continued)

*Primary Examiner* — Twyler Haskins
*Assistant Examiner* — Padma Haliyur
(74) *Attorney, Agent, or Firm* — Moser Taboada

(57) ABSTRACT

A method and apparatus for optimizing image quality based on scene content comprising a sensor for generating a sequence of frames where each frame in the sequence of frames comprises content representing a scene and a digital processor, coupled to the sensor, for performing scene content analysis and for establishing a window defining a number of input frames from the sensor and processed output frames, and for aligning and combining the number of frames in the window to form an output frame, wherein sensor parameters and frame combination parameters are adjusted based on scene content.

20 Claims, 10 Drawing Sheets

(56) References Cited

OTHER PUBLICATIONS

"Integration of Image Capture and Processing—Beyond Single Chip Digital Camera", Suk Hwan Lim and Abbas El Gamal, Information Systems Laboratory, Department of Electrical Engineering, Stanford University, CA, Proceedings of SPIE Electronic Imaging Conference, vol. 4306, pp. 219-226, Jan. 2001.

Image Enhancement using Pattern-Selective Color Image Fusion, Luca Bogoni, Michael Hansen and Peter Burt, Vision Technology Laboratory, Sarnoff Corporation, Princeton, NJ, Proceedings from International Conference on Image Analysis and Processing, 1999, pp. 1-6.

* cited by examiner

METHOD AND APPARATUS FOR OPTIMIZING IMAGE QUALITY BASED ON SCENE CONTENT

CROSS-REFERENCE TO RELATED APPLICATIONS

This application claims benefit of U.S. provisional patent application Ser. No. 61/376,754, filed Aug. 25, 2010, which is herein incorporated in its entirety by reference.

BACKGROUND

1. Field

Embodiments of the present invention generally relate to vision systems, and, more particularly, to a method and apparatus for optimizing image quality based on scene content.

2. Description of the Related Art

Digital cameras, camcorders, digital night vision goggles, thermal weapon sights, robotic image sensors and the like contain electronic image sensors to capture light for processing into still or video images of a scene. Image sensors have a pixel array which consists of a multitude of discrete elements of an image called pixels. Each pixel of the image sensor pixel array provides an output level based on the amount of light, heat or other signals incident on the pixel. One primary type of electronic image sensor is a complementary metal oxide semiconductor (CMOS) sensor. CMOS sensors are becoming very commonly used as electronic image sensors because they produce reasonable image quality with reasonable power consumption at a relatively low cost. Additionally, CMOS fabrication processes are used to integrate image processing circuitry alongside the sensor pixel arrays, i.e., a sensor-image processor integrated circuit.

The image sensor in a digital camera or camcorder can generate a noisy, blurred image due to fast motion caused by camera movement or objects in motion in the scene. Image quality is characterized by such factors as signal/noise (strength of the image signal relative to noise of the imaging process), sharpness (absence of focus or motion blur) and dynamic range (range of light levels accurately represented). In traditional imaging there is a natural tradeoff between noise and blur. To reduce blur, the frame integration time is reduced, but this reduces the light captured and as a result the signal strength relative to the noise. Recently a method for recovering signal strength has been proposed in which the sensor is operated at higher frame rates, and frames are then aligned and combined in the digital domain, to form enhanced quality output frames as described in patent application Ser. No. 11/852,632 filed Sep. 10, 2007 which is hereby incorporated by reference in its entirety. This method, called motion adaptive signal integration, in effect provides signal integration in the digital domain, rather than on the sensor array, to achieve both good output signal/noise performance and low motion blur. However increasing sensor frame capture rates comes at the expense of more complex pixel circuitry, poorer sensor image quality and higher power consumption.

In addition, image sensors in general and CMOS image sensors in particular have variations in response from pixel to pixel. The variation in response includes both offset and gain variations. This is called fixed pattern noise. Fixed pattern noise can be mitigated to a certain degree by calibration and correction. Offset and gain levels per pixel can be measured in a calibration period, and then used in a non-uniformity correction (or NUC) circuit to correct the image. However, the residual fixed pattern noise, even after non-uniformity correction may still be apparent and is especially relevant in extreme low light conditions such as when using night vision where the sensor must be very efficient in converting a small amount of incident light to distinguishable output levels.

Therefore, there is a need in the art for a method and apparatus for optimizing image quality while minimizing power, based on image content when using an image sensor, such as a CMOS image sensor.

SUMMARY

Embodiments of the present invention relate to an apparatus for optimizing image quality based on scene content comprising a sensor for generating a sequence of frames where each frame in the sequence of frames comprises content representing a scene and a digital processor, coupled to the sensor, for performing scene content analysis and for establishing a window defining a number of input frames from the sensor and processed output frames, and for aligning and combining the number of frames in the window to form an output frame, wherein sensor parameters and frame combination parameters are adjusted based on scene content.

Embodiments of the present invention further relate to a computer implemented method for optimizing image quality based on scene content comprising generating a sequence of input frames where each input frame in the sequence of frames comprising content representing a scene, performing scene content analysis for modifying the generating a sequence of input frames based on scene content, establishing a window defining a number of input frames from a sensor and processed output frames in the sequence of frames to be aligned and combined, aligning each frame in the number of frames, based on the content of each frame and combining the aligned number of frames to form an output frame wherein sensor parameters, frame combination parameters and the number of frames in the window to be combined are adjusted based on scene content.

BRIEF DESCRIPTION OF THE DRAWINGS

So that the manner in which the above recited features of embodiments of the present invention can be understood in detail, a more particular description of the invention, briefly summarized above, may be had by reference to typical embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
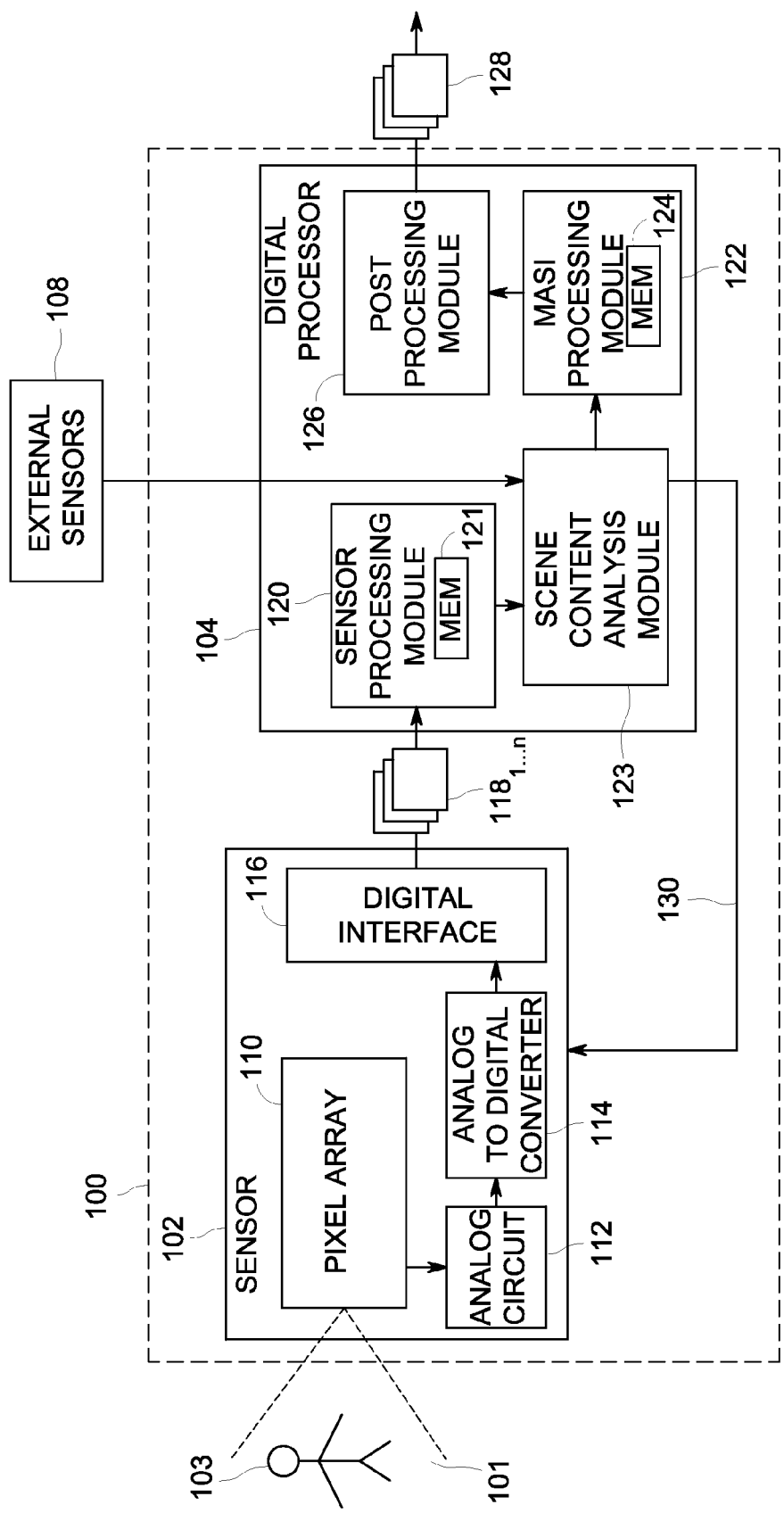
FIG. 1 is a functional block diagram of an apparatus for optimizing image quality based on scene content in accordance with at least one of the embodiments of the present invention.

FIG. 1 is a functional diagram of an exemplary embodiment of an apparatus 100 for optimizing image quality based on scene content in accordance with one or more embodiments of the present invention. In an exemplary embodiment, a sensor 102 is embedded in the apparatus 100 for sensing a scene 101, collocated and integrated with a digital processor 104. The digital processor 104 processes images produced by the sensor 102 and produces an output frame 128. In one exemplary embodiment, the apparatus 100 is coupled to external sensors 108, which may include a scene brightness meter, an inertial measurement unit (IMU) and the like.

In an exemplary embodiment, the sensor 102 comprises a pixel array 110 coupled to an analog circuit 112 for sensing light levels of the scene 101, an analog to digital converter 114 to convert analog image data to digital pixel data for a frame, and digital interface 116 to output a sequence of frames $118_{1...n}$ representing the scene 101 over time. According to an exemplary embodiment, the sensor is a CMOS sensor, although other embodiments include, but are not limited to, an infrared sensor, an ultraviolet sensor, a CCD image sensor, a photovoltaic sensor, and the like. In another embodiment, the sensor 102 stores captured frames in a storage device, where the digital processor 104 processes the frames at a later time. In yet another embodiment, the sensor 102 is part of a digital still camera which captures a short burst of frames for later alignment and combination by the digital processor 104 to create an output frame.

The digital processor 104 comprises a sensor processing module 120 with memory 121, a scene content analysis module 123, a motion adaptive signal processing module 122 with memory 124, and a post processing module 126. The digital processor 104 invokes the sensor processing module 120 which performs image enhancement functions on the sensed images $118_{1...n}$. In an exemplary embodiment, the sensor processing module 120 further performs sensor defect and non-uniformity correction to remove static noise from the sequence and high dynamic range (HDR) processing. In an exemplary embodiment, the sensor processing module 120 contains on-chip memory 121 to store static settings for sensor non-uniformity correction. The sensor processing module 120 then couples corrected frame data to the scene content analysis module 123.

The scene content analysis module 123 performs one or more of the functions of image/signal noise analysis, image brightness analysis, image focus analysis (not shown) and image motion analysis. These analysis functions may be performed in any order or in parallel. In an exemplary embodiment, the scene content analysis module 123 is coupled with the external sensors 108, such as an IMU, a scene brightness sensor and the like, to aid in scene content analysis. The scene content analysis module 123 output is coupled to the motion adaptive signal processing (MASI) module 122 to control MASI parameters, and in effect, parameters of the post processing module 126. Image signal and noise analysis in the scene content analysis module assesses the signal and noise characteristics of the corrected frame data based on sensor exposure settings, known sensor noise characteristics and observed sensor light levels. In exemplary embodiments of the present invention, the image signal and noise analysis is performed as a global measure across the frame, as local measures varying from region to region across the frame, or both. The scene content analysis module 123 performs image brightness analysis for assessing the degree of underexposure or saturation of the frame data based on observed sensor light levels, also performed globally or locally. Finally, the scene content analysis module 123 performs image motion analysis measuring frame to frame motion in the scene 101. In an exemplary embodiment, the motion analysis comprises a global component associated with sensor 102 pan, zoom and/or rotation, and a local component associated with objects moving in the scene 101. In other exemplary embodiments, the scene content analysis module may include other functions, such as image focus analysis, and the like. The output of the scene content analysis module 123 is also coupled to the sensor 102 through control path 130 to control sensor parameters such as integration time, gain and frame rate and optics parameters such as aperture and focus.

The MASI module 122 generates an aligned and combined image output to the post processing module 126. The MASI module 122 establishes a window defining a number of frames to be aligned and combined, selects the number of frames from the corrected sequence of frames $118_{1...n}$ and/or the output image frames 312 and aligns the number of frames with each other in a process described below. The alignment may be performed using content within each frame either locally, with respect to a portion of the frame, and/or globally, with respect to the whole frame. The number of frames selected and parameters of the combination process, such as weighting of those frames, are dynamically adjusted based upon scene content. Such scene content includes scene signal/noise characteristics, brightness, amount of motion, and the like. The MASI module 122 then combines the aligned number of frames to form the output frame 128. The alignment and combination optimizes the quality of the output frame 128, as described further below. As additional frames are generated by the sensor, additional output frames 312 (as shown in FIG. 3 below) are created to produce a sequence of output frames that have enhanced image quality based on scene content. In an exemplary implementation the number of output frames (output frame rate) is equal to the number of input frames. In another exemplary embodiment, the number of output frames may be smaller or larger than the number of input frames.

In an exemplary embodiment, the MASI module provides additional image quality improvements for sensors where residual fixed pattern noise limits the image quality. As the MASI module aligns the scene pattern components (signal) of frames prior to combination, the fixed pattern noise is shifted along with each frame and is no longer fixed frameto-frame relative to the output frame. This operation filters and/or blurs out the residual fixed pattern noise of the input frames. The amount of residual fixed pattern reduction is dependent on the amount of motion and the weighting used in the combination of frames.

Finally, the post processing module 126 performs post processing on the output of the MASI processing module 122. While the MASI module performs image enhancement primarily in the temporal domain by combining multiple image frames, the post processing module performs further image enhancement in the spatial domain, through spatial filters or pixel value adjustments to enhance image features or reduce blur. Optionally one or more enhancement functions may be applied at the post processing stage. One exemplary post processing function is contrast normalization, which is designed to enhance image features (such as edges) for display or analysis, while reducing overall image dynamic range. In another exemplary embodiment, the post processing module 126 performs motion adaptive deblurring for reducing image motion blur. From the scene content analysis module, there will be an estimate of motion blur in each of the frames, due to the integration over time of the sensor 102, thus the post processing module utilizes a deblurring filter tuned to the detected motion. In another exemplary embodiment (not shown), the deblurring takes place before combining the frames in the MASI module. In other exemplary embodiments, the post processing module performs spatial noise reduction, feature enhancement and/or super resolution.

The control path 130 couples control information from the digital processor 104 to the sensor 102. Although the type of control information is unlimited, in some exemplary embodiments, the control information produced by the digital processor 104 controls sensor integration time, gain, extended dynamic range parameter adjustment, frame rate and the like. These controls may be applied on a global basis or on a local basis. As an example, under low light conditions the frame rate of the sensor 102 is increased when motion is detected in the sequence of frames $118_{1 \ldots n}$ and the frame rate is decreased when no motion is detected, thus reducing power consumption of the apparatus 100. In another exemplary embodiment, the control information controls parameters of the optics such as or aperture size or focus.

Figure 2A:
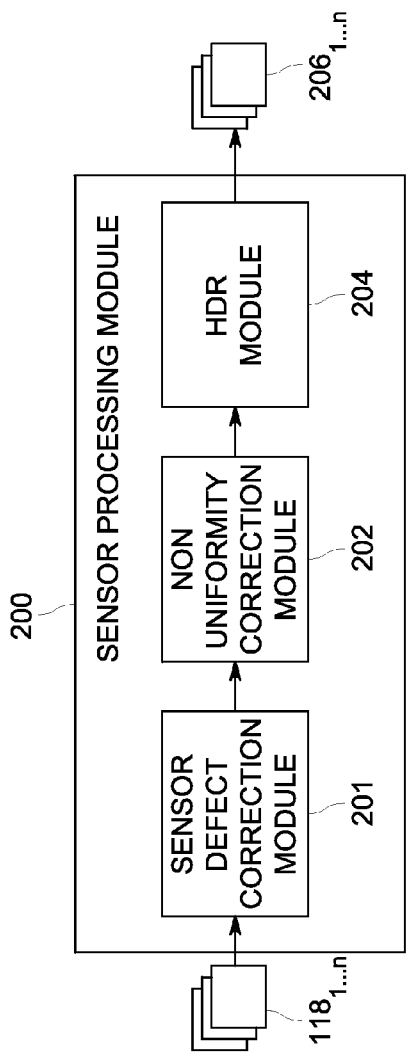
FIG. 2(a) is a functional block diagram of an implementation of the sensor processing module shown in FIG. 1, in accordance with at least one of the embodiments of the present invention.
Figure 2B:
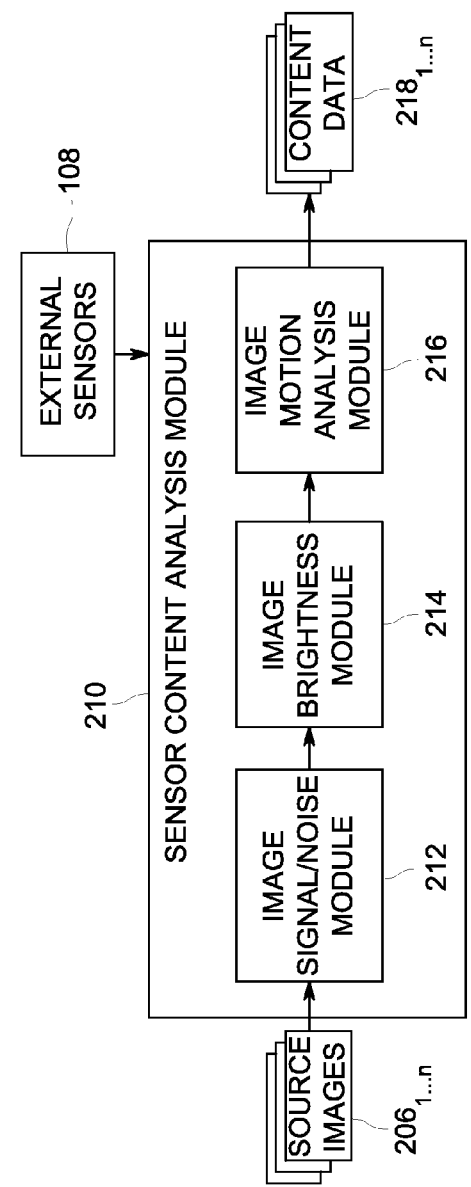
FIG. 2(b) is a functional block diagram of an implementation the scene content analysis module of FIG. 1, in accordance with at least one of the embodiments of the present invention.
Figure 2C:
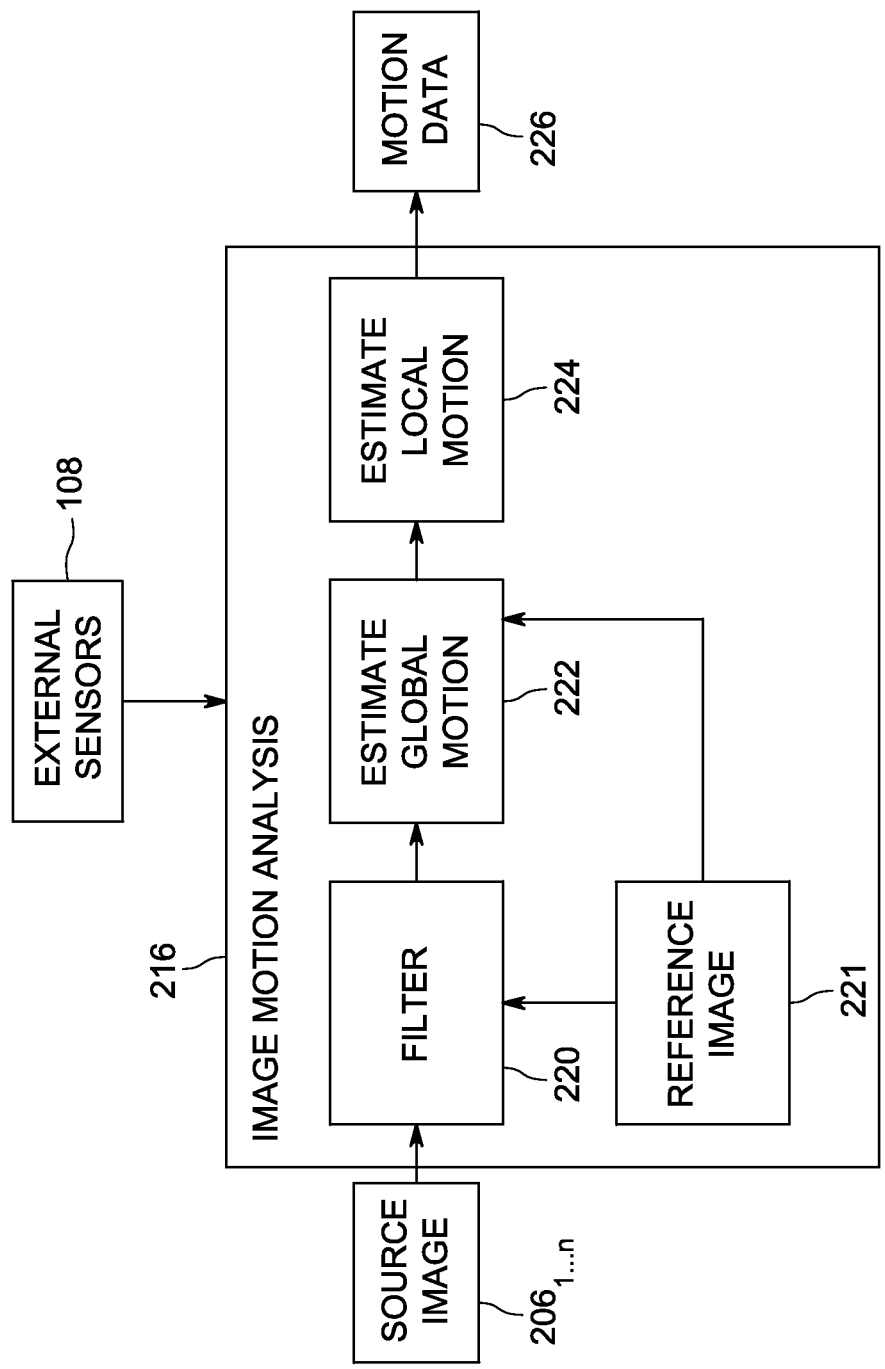
FIG. 2(c) is a functional block diagram of the image motion analysis module in FIG. 2(b), in accordance with an exemplary embodiment of the present invention.

FIG. 2(*a*) is a functional block diagram of an implementation 200 of the sensor processing module 120 shown in FIG. 1, in accordance with at least one of the embodiments of the present invention. The sensor processing module 200 comprises a sensor defect correction module 201, a non-uniformity correction module 202, and an HDR module 204. The sensor defect correction module 201 corrects any sensor defects detected in the sequence of frames $118_{1 \ldots n}$ received from the digital interface 116, such as dead pixels and the like. The non-uniformity correction module 202 compensates for differences in sensor sensitivity from pixel to pixel, thus reducing fixed pattern noise. The HDR module 204 is utilized when the sensor 102 has means of extending the dynamic range beyond that of the analog to digital converter used to convert the analog pixel information to a digital output. In one embodiment the HDR method uses dual high and low gain output channels from the pixel array, with separate analog to digital conversion channels. The dual high/low gain output channels for each frame in $118_{1 \ldots n}$ are combined in the HDR module 204 to form a single extended dynamic range frame for each high/low frame pair. In another embodiment, the analog signal is compressed in a non-linear fashion or piecewise linear fashion prior to the analog-to-digital converter. The HDR module 204 in this case expands the signal to form a linear extended dynamic range frame. The sensor processing module 200 outputs the non-uniformity corrected frames $206_{1 \ldots n}$ to the scene content analysis module 123, described above. The operation of the sensor processing module 120 is described in detail with reference to FIG. 6 below.

FIG. 2(*b*) is a functional block diagram of an implementation 210 the scene content analysis module 123 of FIG. 1, in accordance with at least one of the embodiments of the present invention. The scene content analysis module 123 comprises one or more of a signal-to-noise module 212, an image brightness module 214 and an image motion analysis module 216. Other analysis modules may be included as well, such as a image focus analysis module, and the like. In exemplary embodiments, these modules are arranged in any order. In other exemplary embodiments, the modules 212, 214 and 216 are arranged in parallel. In an exemplary embodiment, external sensors 108 may provide additional measurements used in scene content analysis, such as a brightness meter coupled to the Image brightness analysis module 214 or an IMU coupled to the scene content analysis module 216. The signal-to-noise module 212 assesses the signal and noise characteristics of the frames $206_{1 \ldots n}$ from the sensor processing module 120, based on the exposure settings of the sensor 102, known noise characteristics of the sensor 102, and observed scene light levels, either performed globally or locally.

The image brightness module 214 performs image brightness analysis on the frames $206_{1 \ldots n}$, assessing the degree to which the image is underexposed or over-saturated based on observed scene light levels, performed globally, locally or a combination of both. The image motion module 216 measures frame-to-frame motion in the source frames $206_{1 \ldots n}$. The motion has a global component, representing camera pan, zoom and rotation, as well as a local component representing the motion of objects within the frames $206_{1 \ldots n}$. Motion is determined through frame-to-frame analysis of source frames $206_{1 \ldots n}$. In an exemplary embodiment an IMU in the external sensors 108 may aid in the estimation of camera pan and rotation. The output of the scene content analysis module 123 is coupled to the MASI module 122, and is also fed back to the sensor 102 to control parameters including, but not limited to, integration time, aperture, gain, HDR parameters and frame rate, based on the analysis of the noise, brightness and image motion by the modules 212, 214 and 216.

FIG. 2(*c*) is a functional block diagram of the image motion module 216 in FIG. 2(*b*), in accordance with an exemplary embodiment of the present invention. The image motion module receives corrected frames $206_{1 \ldots n}$ from sensor processing module 120. The optional filter 220 is tuned to the measured noise characteristics of the source images, and serves to reduce noise while maintaining the frame signal in the source image prior to motion analysis. This is especially important in low signal-to-noise scenes, such as scene 101 under low light conditions. Therefore, signal-to-noise ratio is improved in the frames $206_{1 \ldots n}$.

According to an exemplary embodiment, a Laplacian pyramid is used for this filtering, otherwise known as pyramid processing. One embodiment of the pyramid processor performs sub-sampling of digital images according to commonly assigned U.S. Pat. No. 5,359,674 and U.S. Pat. No. 5,963,657 which are hereby incorporated by reference in their entirety. According to U.S. Pat. No. 5,359,674, image data is sampled in pyramid or multi-resolution representations, i.e., sub-sampled images of the original image. Multi-resolution image processing involves recursive or iterative generation of both high-pass filtered and low-pass filtered components of data in a single or multi-dimensional space. For a multi-dimensional signal, a single step in this iterative procedure may, for example, apply the input signal to a multi-dimensional low-pass filter to generate the low-pass filtered output signal. This output signal may then be subtracted from the delayed input signal to produce the high-pass filtered output signal. In an iterative or recursive application of this process, the high-pass filtered data is saved and the procedure described above is applied to the low-pass filtered output signal. This low-pass filtered signal may be represented by a smaller number of samples. If the samples of the high-pass filtered output signals were arranged in layers, with the first high-pass filtered signal on the bottom and successive high-pass filtered signals in increasingly higher layers, the resulting structure would resemble a triangle for one dimensional data or a pyramid for two dimensional data.

A global component for the motion analysis is assessed, relating to sensor zoom, pan and rotation, and a local component is also assessed, relating to motion of objects in the scene 101, such as movement of the person 103. The image motion module 216 estimates global motion at 222, based on reference image 221. In another exemplary embodiment of the present invention, when the optional filter 220 is applied to the source image $206_{1...n}$, it is also be applied to the reference image 221. Motion is estimated by computing an offset between pattern features in the source image and in the reference image. In an exemplary embodiment, the prior source frame serves as the reference image 221. In other embodiments, the reference image 221 is set as the prior output frame, or another stored image of the scene. In other embodiments, the global motion estimates are also used to maintain a sensor motion model, representing both motion velocity and acceleration based on the frame-to-frame motion coupled with optional external sensor data. The sensor motion model, maintained for example within a Kalman filter framework, allows motion of the next several frames to be estimated before the motion is measured. This enables a 'low latency," predictive mode of operation in which the most recent frames are aligned to prior frames based on predicted rather than measured motion.

Figure 3A:
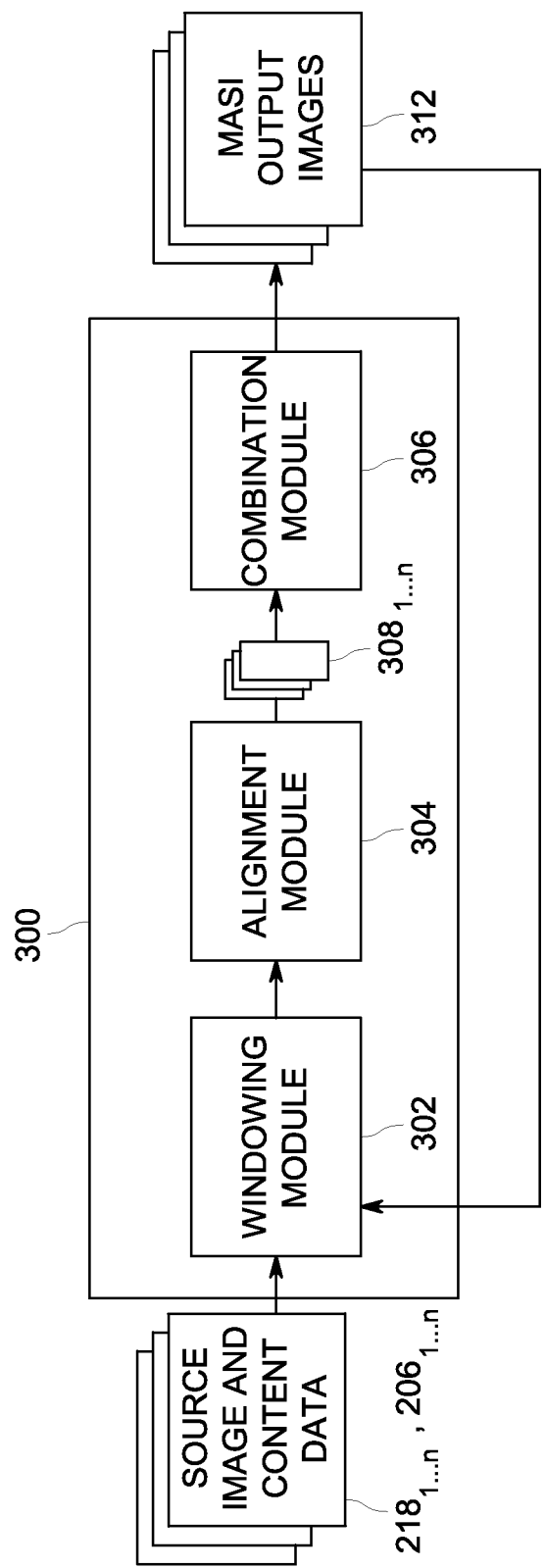
FIG. 3(a) is a functional block diagram of an implementation of the motion adaptive signal processing (MASI) module shown in FIG. 1, in accordance with at least one of the embodiments of the present invention.

FIG. 3(a) is a functional block diagram of an implementation 300 of the MASI module 122 shown in FIG. 1, in accordance with at least one of the embodiments of the present invention. The MASI module 300 comprises a windowing module 302, an alignment module 304 and a combination module 306. Together, the modules select a number of frames from the source sequence of frames $206_{1...n}$ and/or the output frames 312, align the frames in the number of frames based on scene content and then combine the aligned frames to form an output frame 312. Alignment is based on scene motion data $218_{1...n}$ provided by the scene content analysis module 216.

The windowing module 302 establishes a window defining a number of frames in the sequence of filtered frames to be aligned and combined. The alignment module 304 and the combination module 306 operate exclusively on the number of frames in the window. In one exemplary embodiment, a temporal finite impulse response (FIR) filter is used, where the window is a moving window operating on a preset number of source frames $206_{1...n}$ at a time, where content in the frames in the sequence of filtered frames overlap. For example, if the sequence of frames consists of ten frames, and the number of frames in a window is dynamically set to three based on scene contents, the windowing module 302 first chooses frames one through three and aligning and combining occurs on those frames. Subsequently, the windowing module 302 adjusts the size of the window based on scene brightness, for example, and advances the window by one frame and frames two through five are in the window, creating a new composite of frames two, three, four and five. Thus, frames one to three are aligned and combined, then frames two to five are aligned and combined, then frames three through six are aligned and combined, etc. Each set of aligned and combined frames forms an output image. In this manner, alignment module 304 always aligns with overlapping frame content of all frames in the window to one another creating a more accurate alignment and stabilization. In an exemplary embodiment, the frames are combined with a weighted averaging operation. In another embodiment the frames are combined in a weighted selection process.

In another exemplary embodiment, a temporal infinite impulse response (IIR) filter is used, where the window includes a number of both input frames $206_{1...n}$ and the output frames 312. For example, the windowing module may contain just two frames, the current input frame and the prior output frame. The output frame is aligned to the input frame, and then the two are combined as a weighted average. This has the same effect as aligning an infinite number of input frames and combining these with a weight that decreases with the age of the input frame relative to the current frame.

The alignment module 304 uses motion information from the scene content analysis module to warp frames into alignment. Alignment may be to an arbitrary image location. For example, images may be aligned to the current input frame, to the predicted position of the next input frame or to a position of a desired stabilized output frame. In this way image enhancement through MASI can be combined with image stabilization.

Once the alignment module 304 has aligned the frames and each frame in the sequence of aligned frames is assigned a weight, the composite module 306 sums the sequence of aligned frames according to the weight to produce an output frame 312. The combination may be an average or a selection process. For example, an average may be used to reduce noise according to $I_o = W_1 I_1 + W_2 I_2 + W_3 I_3$, where $W_i$ represents the weight of frame "i" and $I_i$ is the frame "i". Alternatively, selection may be used to the extend dynamic range or depth of field of the output frame by selecting features from source frames that best represent the scene in terms of brightness or focus, on a local, region by region, basis. In exemplary embodiments of the present invention, the weights of each of the frame are based on noise levels, light levels, amounts of motion, focus, custom settings and the like. For example, if the weight is based on noise levels, a frame with low noise levels has a higher weight than a frame with high noise levels, so that the resulting output frame 312 has lower noise. Similarly frames with high levels of motion may be weighted lower than frames with low levels of motion in order to minimize blur. The output frame 312 is now coupled to the post processing module 126 shown in FIG. 1.

Figure 3B:
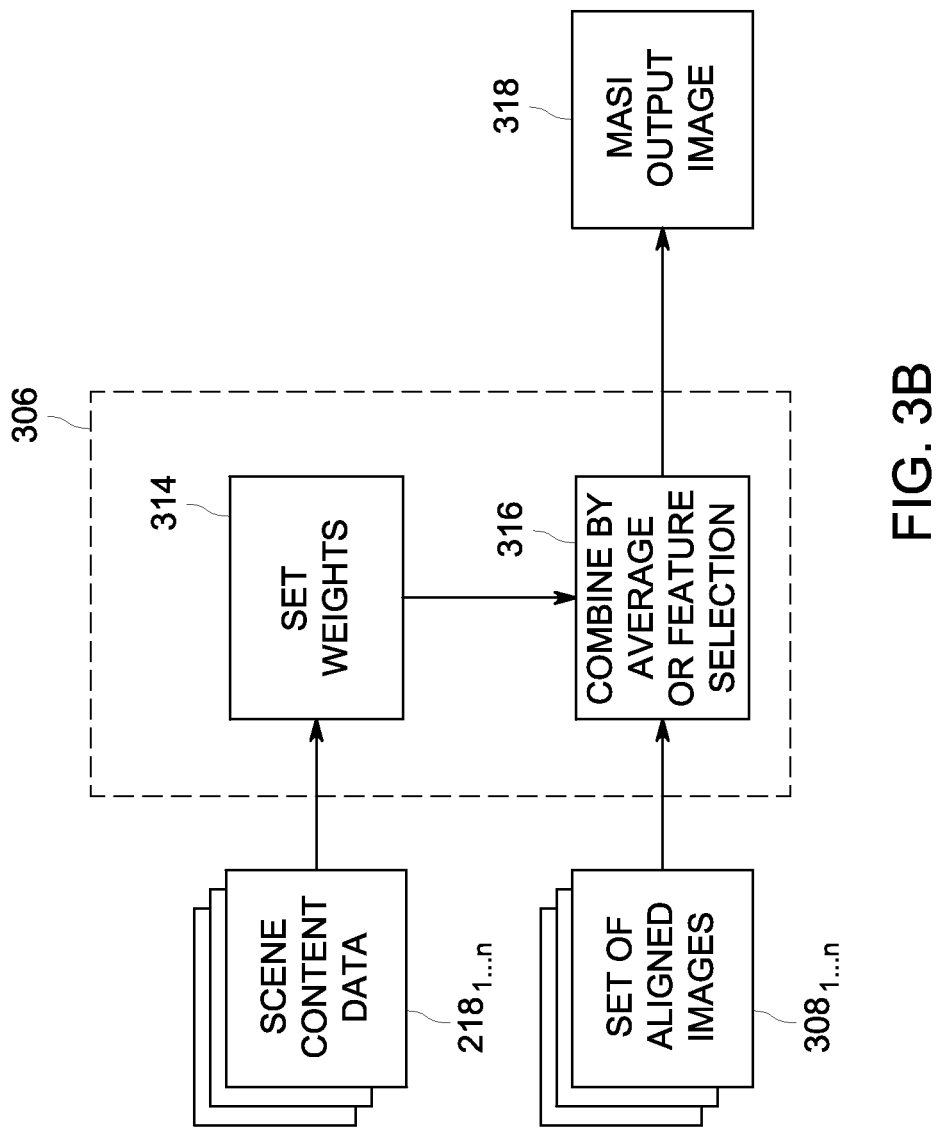
FIG. 3(b) is a functional block diagram depicting the combination module of FIG. 3(a) in accordance with one or more aspects of the present invention.

FIG. 3(b) is a functional block diagram depicting the combination module 306 of FIG. 3(a) in accordance with one or more aspects of the present invention. The composite module 306 receives aligned frames $308_{1...n}$ from the alignment module and combines these frames into a single output frame 318 based on scene content information $218_{1...n}$ from the scene content analysis module 210. The combination process may be linear or non-linear. For noise reduction, frames are typically combined as a weighted sum on a pixel by pixel basis, i.e., as a FIR or IIR temporal filter. For other functions, such as extended dynamic range or depth of field, images are combined using a feature selective method in a transform domain. Typical implementations use the Laplacian pyramid domain. Weights are used to help guide the selection process. Global weights may be used, in which case the same weight is used for all samples in a given source image. Or local weights may be used, in which case weights vary from region to region, based on local scene content information. According to an exemplary embodiment, when noise levels are low more weight is given to the most recent frame. When noise levels are high, weights are distributed more evenly over more frames in the set of aligned images $308_{1...n}$. Similarly, when there is local residual motion detected in the frames $206_{1...n}$, more weight is given to recent frames while weight is distributed more evenly when there is little residual motion. This process is applied, for example when foreground objects are moving in the scene.

Figure 4:
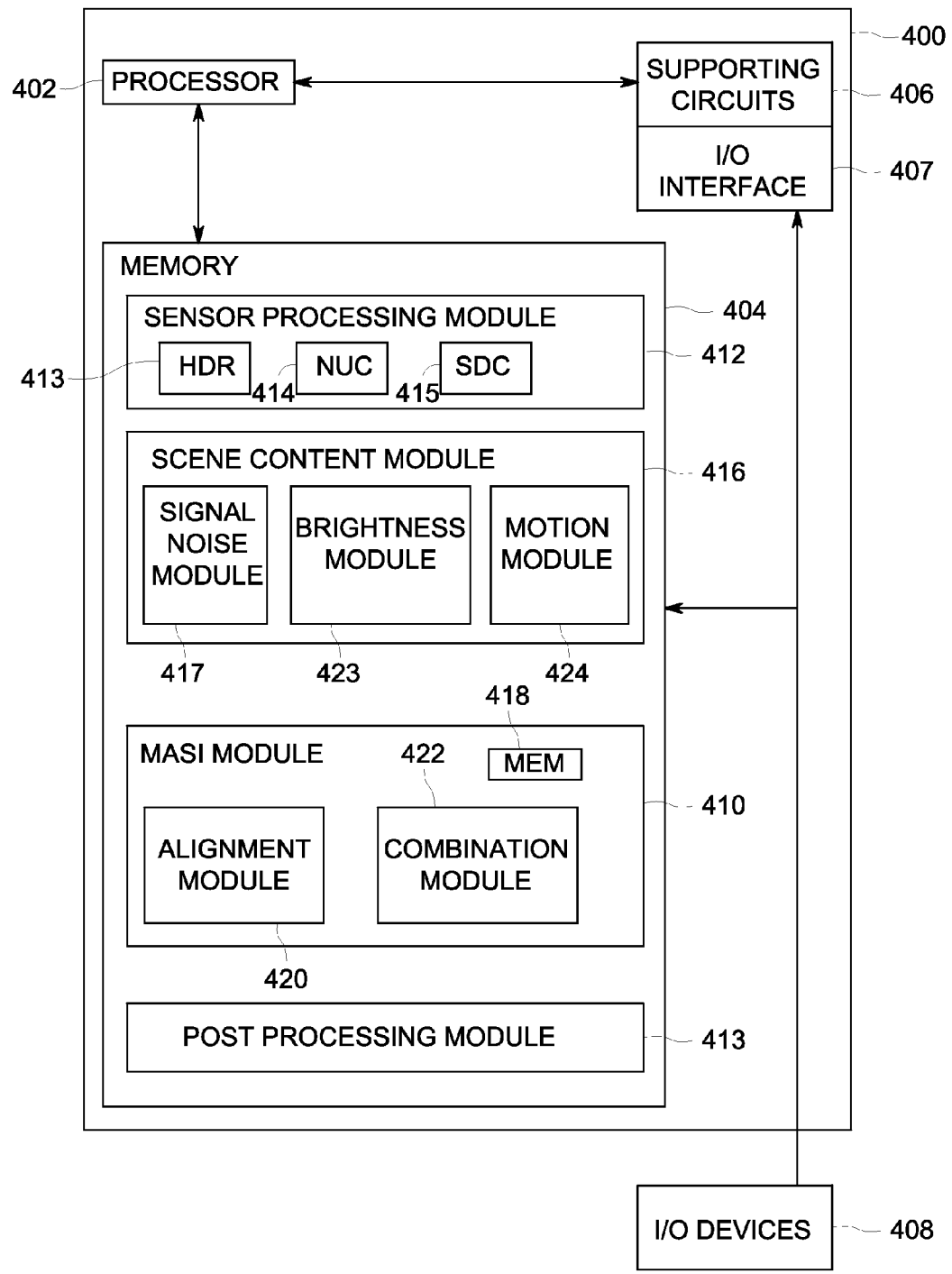
FIG. 4 is a block diagram depicting an exemplary embodiment of a computer system in accordance with one or more aspects of the present invention.

FIG. 4 is a block diagram depicting an exemplary embodiment of a computer system 400 in accordance with one or more aspects of the invention. The computer system 400 is used to implement a portion of the apparatus 100, namely the sensor processing module 120, the scene content analysis module 123, the MASI module 122 and the post processing module 126. The computer system 400 includes a processor 402, a memory 404 and various support circuits 406. The processor 402 may include one or more microprocessors known in the art, and/or dedicated function processors such as field programmable gate arrays programmed to perform dedicated processing functions. The support circuits 406 for the processor 402 include microcontrollers, application specific integrated circuits (ASIC), cache, power supplies, clock circuits, data registers, I/O interface 407, and the like. The I/O interface 407 may be directly coupled to the memory 404 or coupled through the supporting circuits 406. The I/O interface 407 may also be configured for communication with input devices and/or output devices 408, such as, network devices, various storage devices, mouse, keyboard, displays, sensors and the like.

The memory 404 stores non-transient processor-executable instructions and/or data that may be executed by and/or used by the processor 402. These processor-executable instructions may comprise firmware, software, and the like, or some combination thereof. Modules having processor-executable instructions that are stored in the memory 404 comprise a MASI module 410, a sensor processing module 412, a scene content analysis module 416 and a post processing module 413. According to an exemplary embodiment of the present invention, the sensor processing module 412 contains a sensor defect correction module 415, a non-uniformity correction module 414 and an HDR module 413. The scene content analysis module 416 contains a signal noise module 417, a brightness module 423 and a motion analysis module 424. As described above, in an exemplary embodiment the MASI module 410 contains a windowing module 418 for selecting a number of frames from the sequence of filtered frames as a "window" for further image processing and adjusting the number based on scene contents, an alignment module 420, for aligning the frames currently in the window, and a composite module 422 for assigning weights to the frames and combining the sequence of aligned frames to form the output frame 212. In an exemplary embodiment, the memory 404 may include one or more of the following: random access memory, read only memory, magneto-resistive read/write memory, optical read/write memory, cache memory, magnetic read/write memory, and the like, as well as signal-bearing media as described below.

Figure 5:
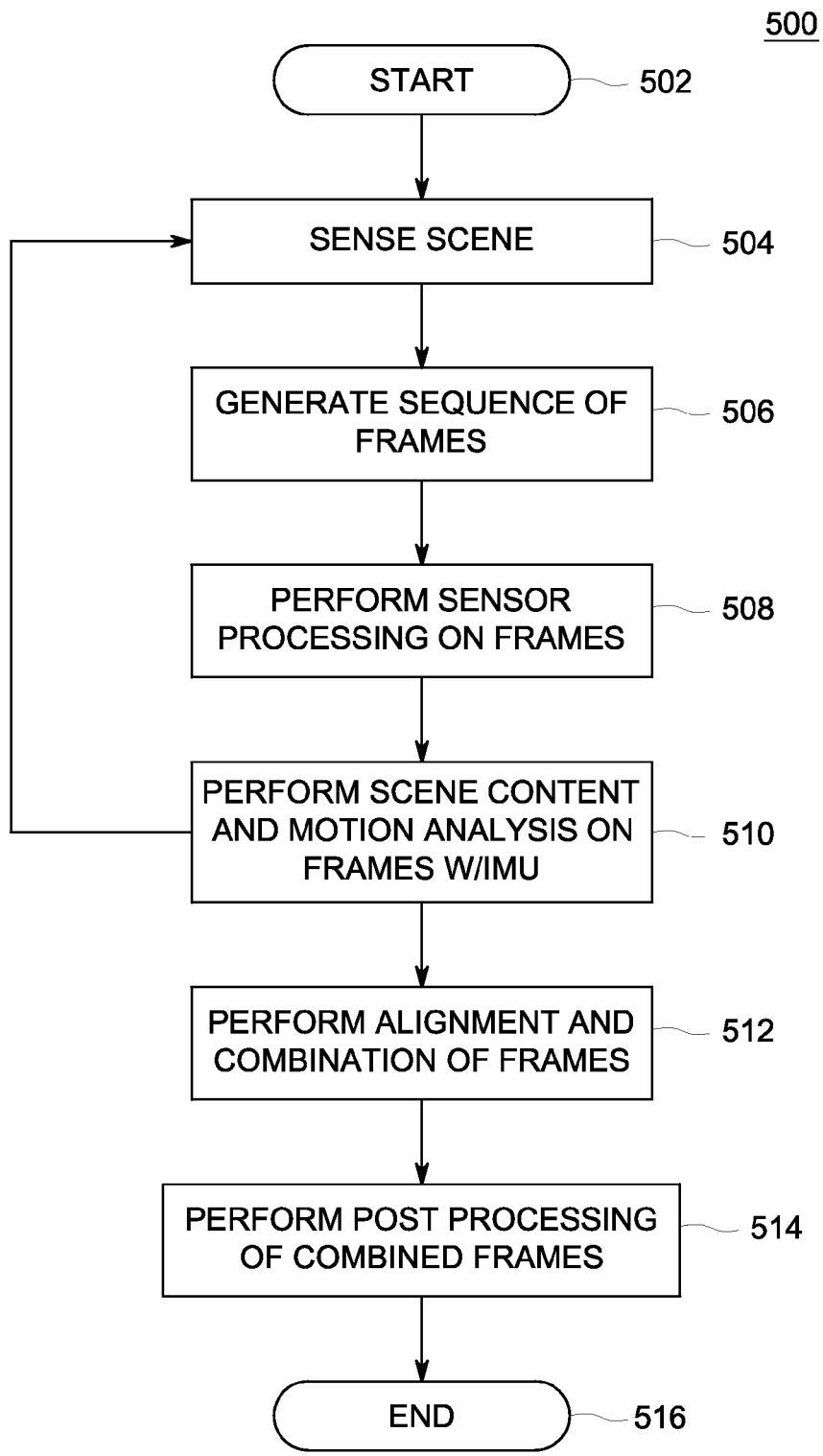
FIG. 5 is a flow diagram of a method for optimizing image quality based on scene content in accordance with an exemplary embodiment of the present invention.

FIG. 5 is a flow diagram of a method 500 for optimizing image quality based on scene content in accordance with an exemplary embodiment of the present invention. Method 500 represents overall operation of the apparatus 100 as shown in FIG. 1 for optimizing image quality based on scene content. Method 500 begins at step 502 and proceeds to step 504 where a scene 101 is sensed (imaged) by the sensor 102. At step 506, a sequence of frames are generated by the digital interface 116, after being converted to digital data by analog-to-digital circuit 114, comprising content representing the scene 101. At step 508, sensor processing is performed on the sequence of frames by the sensor processing module 120 to produce an extended dynamic range, defect and corrected sequence of frames using sensor defect correction module 201, non-uniformity correction module 202 and HDR module 204.

At step 510, the non-uniformity corrected sequence of frames is analyzed for scene content, both globally and locally, by the scene content analysis module 123 with additional data from the external sensors 108. At step 512, the windowing module 302 of the MASI module 122 establishes a window defining a number of frames in the sequence of frames to be aligned and combined. At step 512, each frame in the number of frames is aligned by the alignment module 304 to produce a sequence of aligned frames 308. Weighting of each frame in the number of frames is applied to control the prominence of the content from various frames, e.g., less content from earlier frames used in the final image. At step 512, the sequence of aligned frames are also combined based on the weights set in the composite module 306 of the MASI module 122 to form the output frame 128. The output frame 128 is processed at step 514 by the post processing module 126 for enhancing the visibility of the image 128 and the method ends at step 516.

Figure 6:
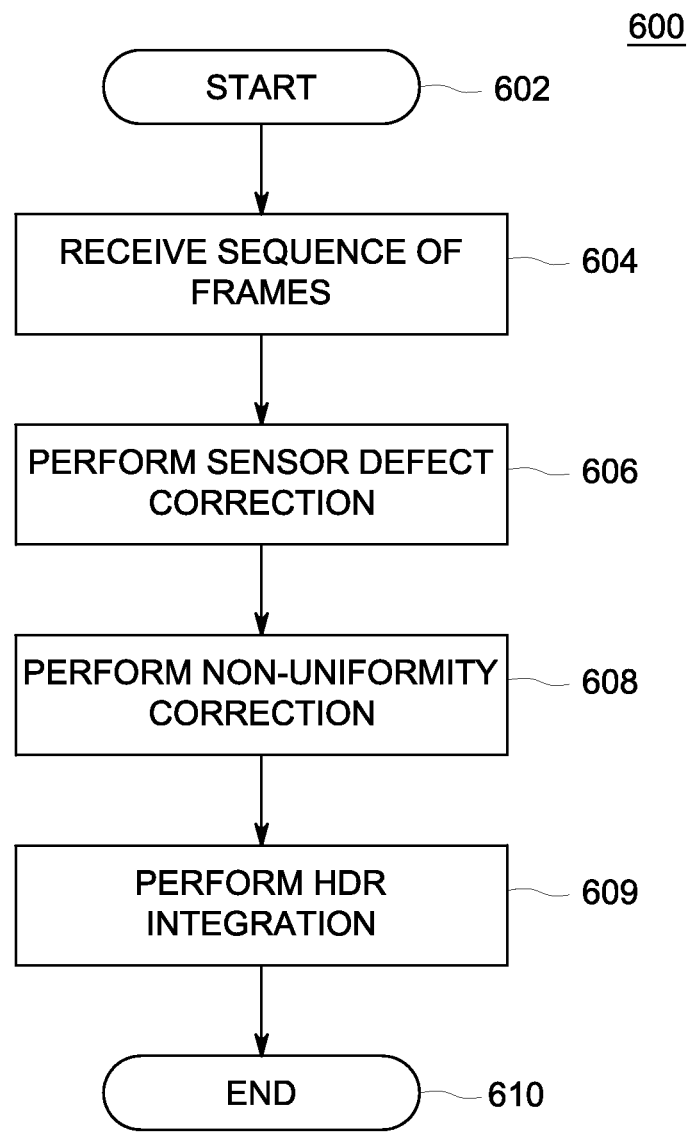
FIG. 6 is a flow diagram of a method for operation of the sensor processing module in accordance with one or more aspects of the present invention.

FIG. 6 is a flow diagram of a method 600 for operation of the sensor processing module 120 in accordance with one or more aspects of the present invention. The method begins at step 602 and proceeds to step 604. At step 604, the sensor processing module 120 receives the sequence of frames $118_{1...n}$ from the digital interface 116. At step 606, sensor defect correction is performed on the sequence of frames $118_{1...n}$ by the sensor defect correction module 201. The sensor defect correction module 201 generates a sequence of sensor defect corrected frames. At step 608, the sequence of sensor defect corrected frames are coupled to the non-uniformity correction module 202, where non-uniformity correction is performed. At step 609, the sensor processing module 120 performs HDR processing as discussed above on the sequence of frames using the HDR module 204. The method 600 ends at step 610.

Figure 7:
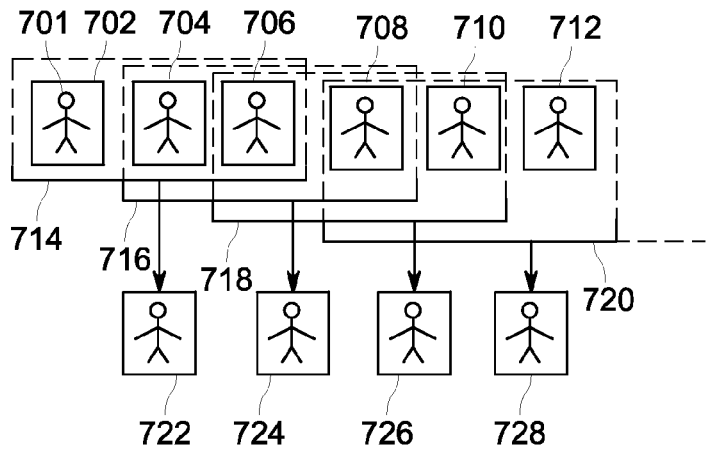
FIG. 7 is an illustration of an implementation of a method for optimizing image quality based on scene content in accordance with an exemplary embodiment of the present invention.

FIG. 7 is an illustration of an implementation of the method 500 for optimizing image quality based on scene content in accordance with an exemplary embodiment of the present invention. A sequence of frames 702, 704, 706, 708, 710 and 712 are shown. In an FIR filter, in an exemplary embodiment, the window 714 is first established over the frames 702, 704 and 706. Thus, frames 702, 704 and 706 are simultaneously aligned with one another and combined, producing output frame 722. In the next iteration, a new window 716 is established over the frames 704, 706, and 708 producing aligned output frame 724. In the next iteration, a new window 718 with more frames is established over the frames 706, 708, 710 and 712 producing aligned output frame 726. In an exemplary embodiment, window 718 contains more frames to improve the quality of the output frame because the detected light levels in the scene are low. Window 718 may also contain fewer frames if the detected light levels were high, or there was little motion detected in the scene, and the like, to improve the quality of the output frame. In the next iteration, window 720 produces output frame 728. In the example of local alignment, the subject 701 is aligned such that it is at the center of output frame 722. Here, the method 500 aligns the image on the principle content of the frame sequence, e.g., subject 701. Often, the sensor 102 moves unpredictably as a user may hold the camera in an unstable manner. The alignment module 403 aligns the subject 701 so that a user is able to keep the subject 701 centered or in the scene.

According to generated light levels by the sensor as well as other factors described above, weights are determined for each frame. For example, if the scene content module determines that frames 706 and 708 have the best light levels, these are assigned higher weights than frame 704. Then, when the frames are combined according to: $I_o = w_{704}I_{704} + w_{706}I_{706} + w_{708}I_{708}$, the weights $w_{706}$ and $w_{708}$ are greater than $w_{704}$, causing the output frame to be more similar to frame 706 and frame 708 than frame 704. In other embodiments of the present invention, other factors such as noise levels, scene content, scene motion and the like also impact weighting of frames. Weight may be varied both locally and globally. Image combination may be either linear, as a weighted average, or non-linear, for example as a feature selective fusion process. Thus, image quality is optimized based upon content of the frame sequence.

According to other embodiments, a section or area of all of the frames 702-712 are used for alignment. For example, the area surrounding point the center points of frames 702-712 are used as the section around which to align the frame. Thus, subject 701 is integrated out of the frame since it does not mainly appear in the specified alignment area. Once output frame 722 is produced by combining over the window 714, the window 714 is advanced by one frame, such that the window 716 is established over frames 704, 706 and 708. In this manner, image output quality is optimized and the scene content is stabilized even in low-light or other poor visibility conditions.

According to another embodiment of the present invention, one frame is assigned as a reference frame in order to perform stabilization of the other frames according to that reference frame. For example, frame 706 is determined as the reference frame, thus frames 702, 704, 708 and 710 are stabilized according to the position of subject 701 in frame 706. In this manner, the output frame to the display appears stabilized (e.g., camera motion is mitigated) and does not constantly appear in motion, making objects in the scene easier to observe.

Figure 8:
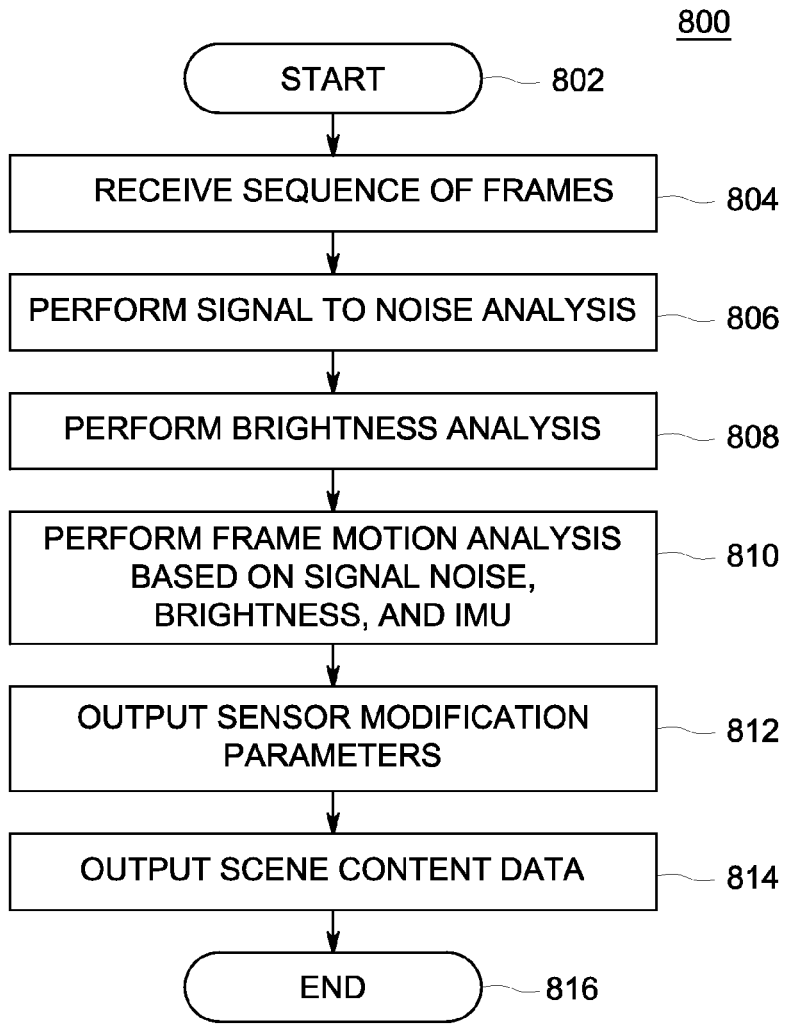
FIG. 8 is a flow diagram of a method for operation of the scene content analysis module in accordance with one or more aspects of the present invention.

FIG. 8 is a flow diagram of a method 800 for operation of the scene content analysis module 123 in accordance with one or more aspects of the present invention. The method begins at step 802 and proceeds to step 804. At step 804, the scene content analysis module 123 receives the sequence of sensor corrected frames from the sensor processing module 120. The signal/noise analysis module 212 performs signal to noise analysis to determine image noise characteristics, globally, locally or both. The method then moves to step 808, where the brightness module 214 performs brightness analysis based on light levels, globally, locally or both. The method then performs frame motional analysis from frame to frame with the motion module 216. The result of steps 806, 808 and 810 are fed back to the sensor 102 and parameters (such as integration time, aperture, frame rate, gain, HDR parameters, focus) of the sensor 102 are modified accordingly. At step 814, the scene content is output to the MASI module 122. The method ends at step 816. In another exemplary embodiment of the present invention, steps 806-810 are performed in parallel or in a differing order.

Figure 9:
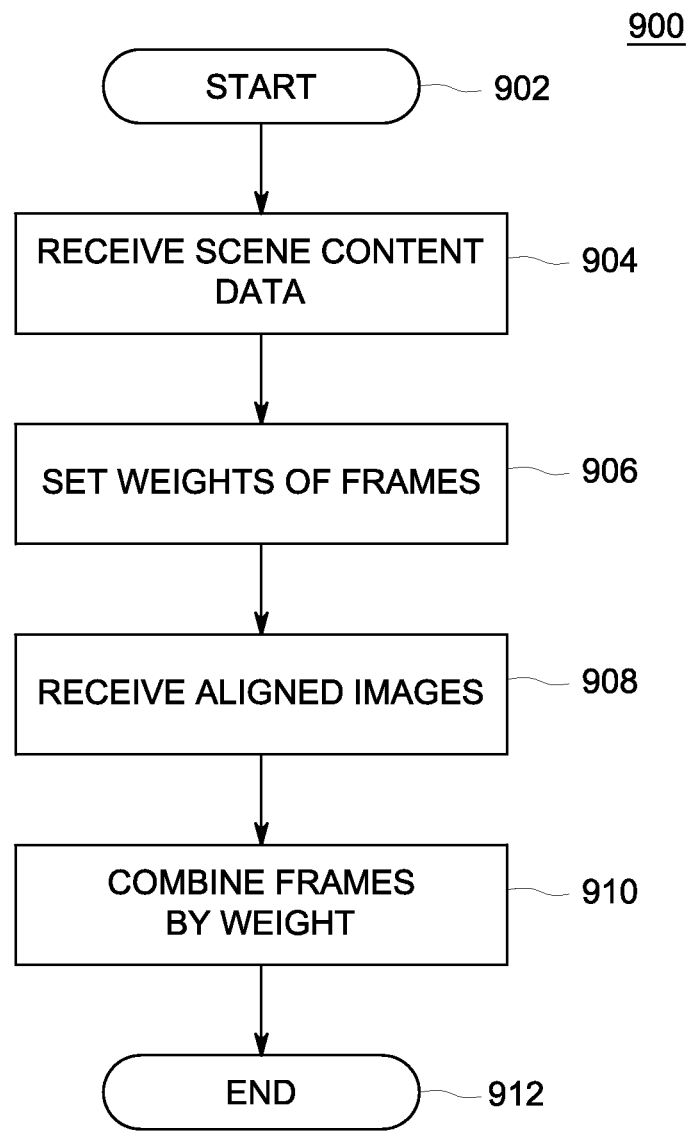
FIG. 9 is a flow diagram of a method for operation of the combination module of the MASI module in accordance with one or more aspects of the present invention.

FIG. 9 is a flow diagram of a method 900 for operation of the combination module 306 of the MASI module 122 in accordance with one or more aspects of the present invention. The method begins at step 902 and proceeds to step 904. At step 904, the composite module receives the scene content data frames from the scene content analysis module 123. The composite module 306 sets the weights of the frames either globally or locally based on the scene content data at step 906, such as brightness levels, noise level and motion. In an exemplary embodiment, if noise levels are low, recent frames are given a higher weight and vice-versa. In another exemplary embodiment, when there is local residual motion, recent frames are given higher weights and vice versa. The composite module then receives the aligned frames $308_{1 \ldots n}$ from the alignment module 304 at step 908. At step 910, the aligned frames $308_{1 \ldots n}$ are combined into one output image by averaging the frames based on their weight, or by a non-linear process such as feature selection, accounting for the weighting set in step 904, so the output frame is more similar to individual frames which have less noise, better focus and the like, than the other frames. The method ends at step 912.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, and modules are described above in association with their respective functions. These elements, devices, and modules are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. An apparatus for optimizing image quality based on scene content comprising:
   a sensor for generating a sequence of frames, where each frame in the sequence of frames comprises content representing a scene; and
   a digital processor, coupled to the sensor, for establishing a window that defines a number of input frames, a subset of frames from the sequence of frames generated by the sensor, for performing scene content analysis on the number of input frames in the window, and for aligning and combining the number of frames according to a respective weight of each of the number of frames in the window to form one or more output frames as the sequence of frames are generated from the sensor, wherein the respective weight is computed based on at least one of noise levels, light levels, amount of motion in a frame, and focus settings,
   wherein sensor parameters and combining parameters are adjusted based on scene content and the number of input frames in the window is dynamically adjusted based on the scene content in one or more of the input frames.

2. The apparatus of claim 1 wherein the scene content upon which the sensor parameters and the combining parameters are adjusted is at least one of scene brightness, amount of motion in the scene, focus and scene noise as detected in the sequence of frames by the digital processor,
   wherein the combining parameters comprise at least one of the number of input frames from the sensor and processed output frames to be combined, a method of frame combination comprising at least one of average or selection, and the respective weight of each of the number of input frames used in frame combination.

3. The apparatus of claim 1 wherein the digital processor further performs post processing comprising at least one of contrast normalization, motion adaptive deblurring, spatial noise reduction and feature enhancement on the output frame.

4. The apparatus of claim 2 wherein the digital processor further comprises:
a motion module configured for analyzing motion at least one of globally or locally within the sequence of frames;
a windowing module configured for establishing the window of the number of the input frames from the sensor and processed output frames;
an alignment module, coupled to the windowing module, configured for aligning the number of frames in the window; and
a combination module, coupled to the alignment module, configured for assigning the respective weight to each frame at least one of globally or locally based on scene contents and temporal occurrence of each frame and the combination module is configured for the combining of the aligned number of frames using their respective weight and generating the output frame.

5. The apparatus of claim 4 wherein a filter is applied to frames in the window of frames in order to enhance signal and reduce noise in individual frames prior to motion analysis.

6. The apparatus of claim 4 wherein a sensor motion model is generated based on at least one of frame motion analysis and an external inertial measurement unit, comprising acceleration and velocity information, and use of the sensor motion model to align images based on predicted motion.

7. The apparatus of claim 1 wherein the digital processor further controls parameters associated with the sensor by providing a feedback control to the sensor based upon content within the sequence of frames,
wherein the controlled parameters comprise at least one of a frame rate, a gain level, sensor integration time, optics aperture size and focus.

8. The apparatus of claim 4 wherein the alignment is performed as a Finite Impulse Response filter, and the window is advanced by at least one frame in the sequence of frames wherein the combining the number of frames overlaps with a previous combining by at least one frame and the output frame is aligned with the number of frames currently in the window.

9. The apparatus of claim 4 wherein the alignment is performed as an Infinite Impulse Response filter and the window includes both input frames from the sensor and processed output frames.

10. The apparatus of claim 4 wherein the alignment is performed at least one of globally wherein all portions of each of the subset of frames are aligned across the subset of frames in the window or locally where one area of the subset of frames is aligned across the subset of frames in the window.

11. A computer implemented method for optimizing image quality based on scene content comprising:
generating, from a sensor, a sequence of frames where each input frame in the sequence of frames comprising content representing a scene;
establishing a window defining a number of input frames, a subset of frames from the generated sequence of frames;
performing scene content analysis on the number of input frames in the window;
aligning each frame in the number of frames, based on the content of each frame; and
combining the aligned number of frames according to a respective weight of each of the number of frames to form one or more output frames, wherein the respective weight is computed based on at least one of noise levels, light levels, amount of motion in a frame, and focus settings,
wherein sensor parameters and combining parameters are adjusted based on scene content and the number of input frames in the window is dynamically adjusted based on the scene content in one or more of the input frames.

12. The method of claim 11 wherein the scene content upon which the sensor and combining parameters are adjusted is at least one of scene brightness, amount of motion in the scene, focus and scene noise as detected in the sequence of frames,
wherein the combining parameters comprise at least one of the number of input frames from the sensor and processed output frames combined, a method of frame combination comprising at least one of average or selection, and the respective weight of each of the number of input frames used in frame combination.

13. The method of claim 11 further comprising performing at least one of contrast normalization, motion adaptive deblurring, spatial noise reduction and feature enhancement on the output frame.

14. The method of claim 12 further comprising:
analyzing motion at least one of globally or locally within the sequence of frames;
establishing the window of the number of the input frames from the sensor and processed output frames;
aligning the number of frames in the window; and
assigning the respective weight to each frame at least one of globally or locally based on scene contents and temporal occurrence of each frame and for the combining of the aligned number of frames using their respective weight and generating the output frame.

15. The method of claim 14 wherein a filter is applied to frames in the window of frames in order to enhance signal and reduce noise in individual frames prior to motion analysis.

16. The method of claim 14 wherein a sensor motion model is generated based on at least one of global frame motion analysis and an external inertial measurement unit, comprising acceleration and velocity information, and use of the sensor motion model to align images based on predicted motion.

17. The method of claim 11 further comprising controlling parameters associated with the sensor by providing a feedback control to the sensor based upon content within the sequence of frames,
wherein the controlled parameters comprise at least one of a frame rate, a gain level, sensor integration time, optics aperture size and focus.

18. The method of claim 14 wherein the alignment is performed as a Finite Impulse Response filter, and the window is advanced by at least one image in the sequence of frames wherein the combining the number of frames overlaps with a previous combining by at least one frame and the output frame is aligned with the number of frames currently in the window.

19. The method of claim 14 wherein the alignment is performed as an Infinite Impulse Response filter and the window includes both input frames from the sensor and processed output frames.

20. The method of claim 14 wherein the alignment is performed at least one of globally wherein all portions of each of the subset of frames are aligned across the subset of frames in the window or locally where one area of the subset of frames is aligned across the subset of frames in the window.

* * * * *